United States Patent [19]

Kirkman

[11] 3,970,051

[45] July 20, 1976

[54] ROTARY ENGINE DEVICE

[76] Inventor: Thomas E. Kirkman, R.R. 2, Box 342, Odon, Ind. 47562

[22] Filed: May 2, 1975

[21] Appl. No.: 573,928

[52] U.S. Cl. ............................. 123/8.09; 123/8.45; 418/219
[51] Int. Cl.² .................... F02B 53/00; F02B 53/10
[58] Field of Search ......................... 123/8.09, 8.45; 418/217, 218, 219

[56] References Cited
UNITED STATES PATENTS

| | | | |
|---|---|---|---|
| 173,030 | 2/1876 | Lucas | 418/218 X |
| 2,380,886 | 7/1945 | Waldie | 418/219 |
| 2,622,569 | 12/1952 | Rochefort | 418/219 X |
| 3,101,059 | 8/1963 | Easter | 418/219 X |
| 3,307,487 | 3/1967 | Steadman | 418/219 X |
| 3,838,954 | 10/1974 | Rapone | 418/218 X |

FOREIGN PATENTS OR APPLICATIONS

| | | | |
|---|---|---|---|
| 602,180 | 5/1948 | United Kingdom | 418/219 |

Primary Examiner—Carlton R. Croyle
Assistant Examiner—Michael Koczo, Jr.
Attorney, Agent, or Firm—Bacon & Thomas

[57] ABSTRACT

A rotary engine device, which may be an internal combustion engine or a pump, having a spherical rotor with a radial web rotatable in an oblique chamber, and curved vanes axially slidable through the web, is provided with an outer ring fixed to the outer periphery of the web to rotate therewith and having a spherical inner surface defining the outer peripheral wall of the oblique chamber. The ring eliminates circumferential sliding friction between the vanes and the outer wall of the chamber. When constructed as an internal combustion engine, a drum cam fixed to the rotor actuates intake and outlet valves, an ignition device and a fuel injector so that each is actuated only on alternate revolutions of any one expansion compartment between vanes to produce four-stroke-cycle operation of the engine.

11 Claims, 8 Drawing Figures

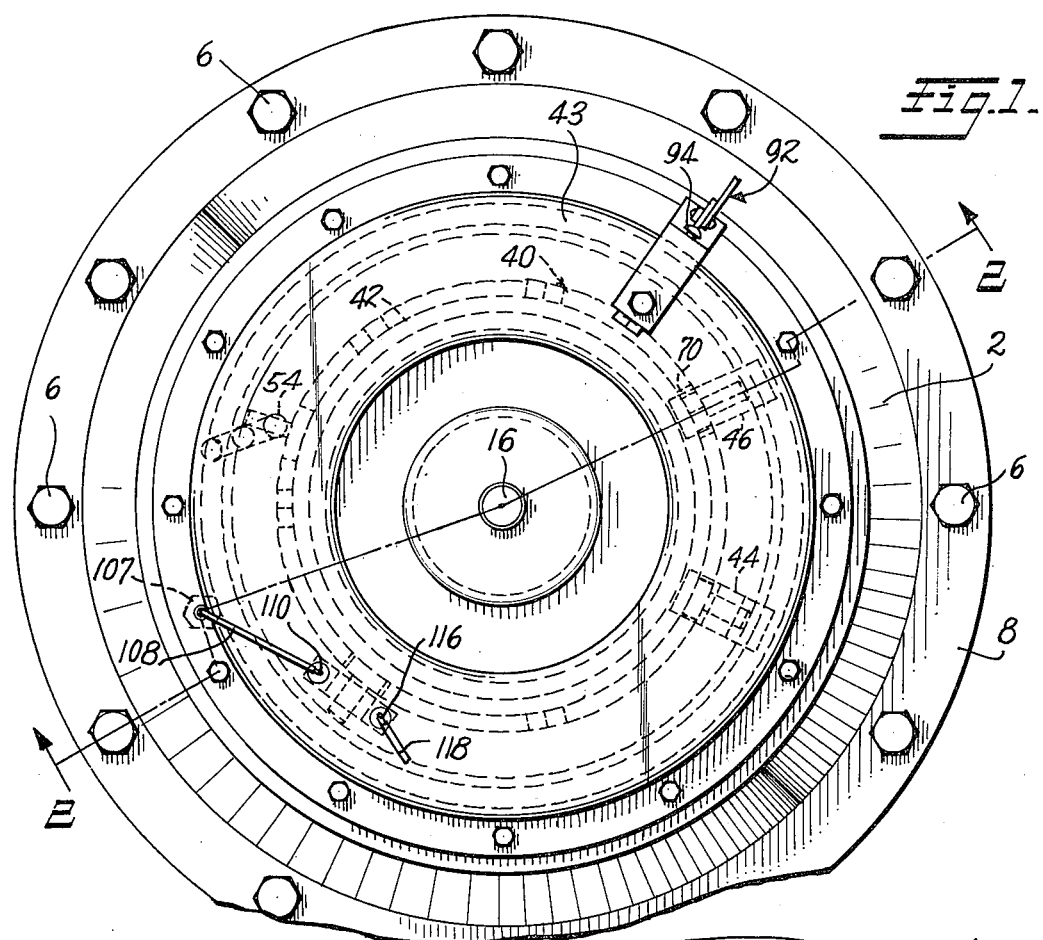
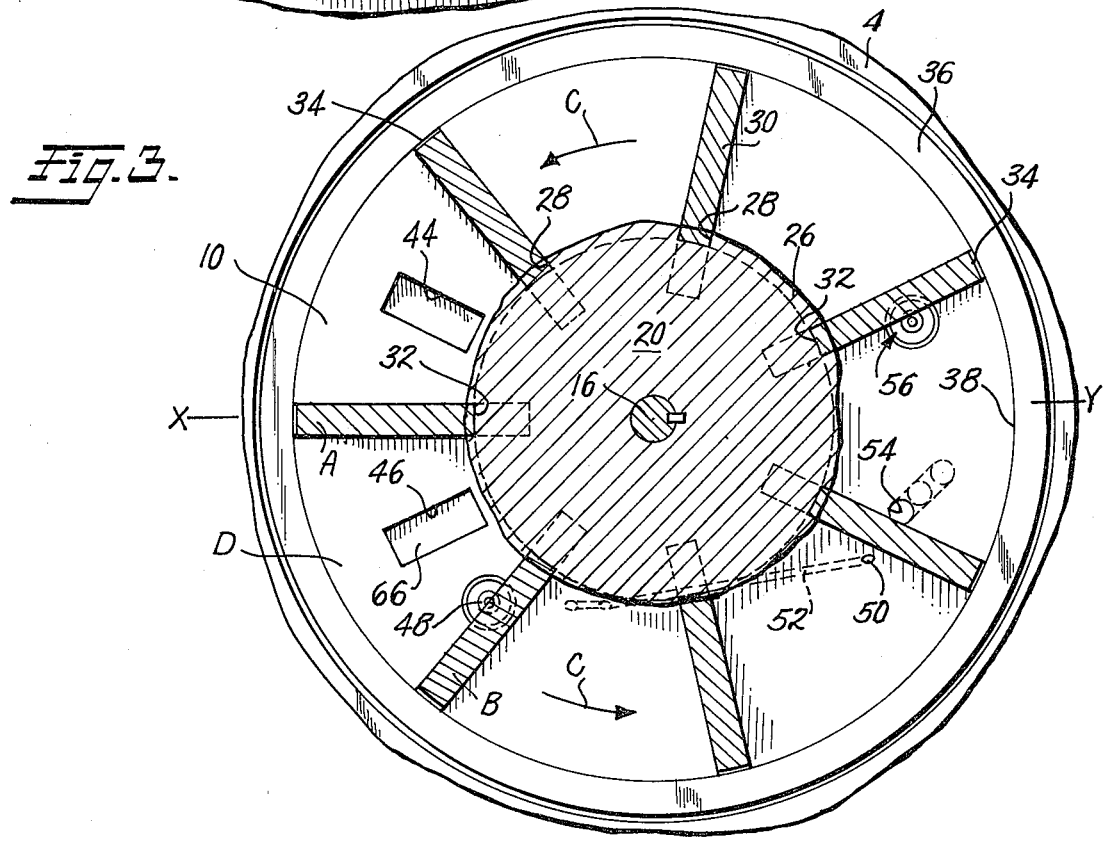

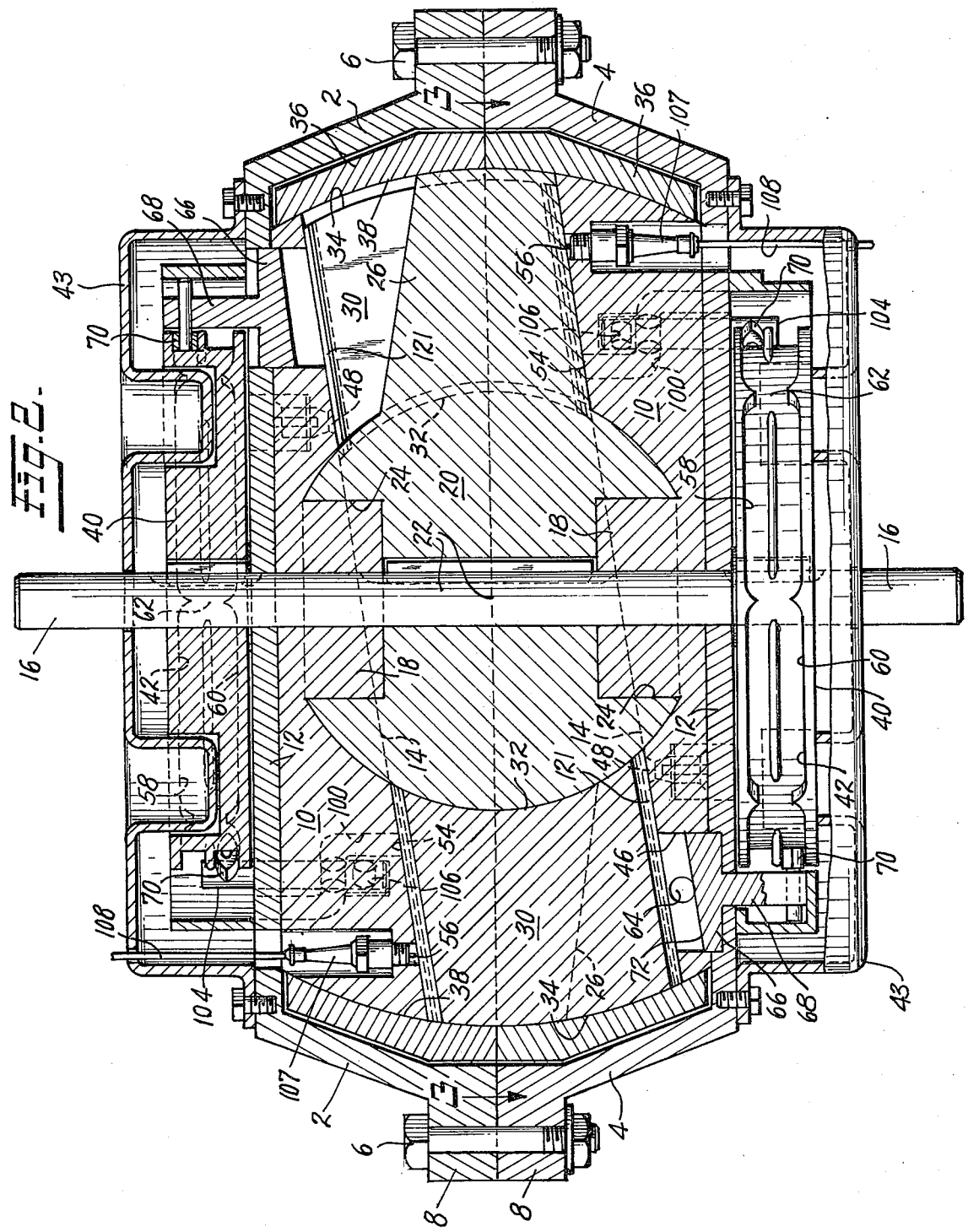

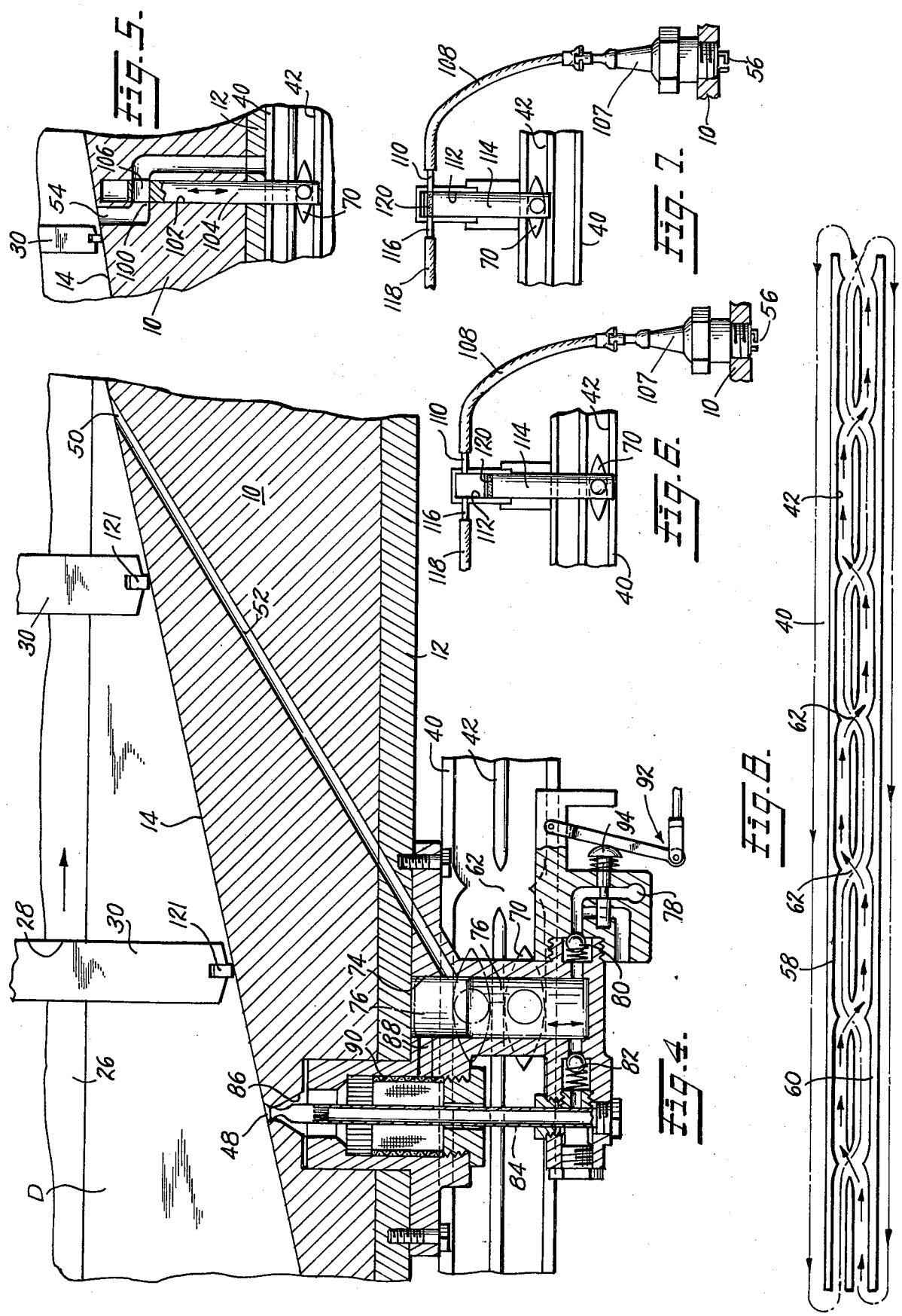

ROTARY ENGINE DEVICE

BACKGROUND OF THE INVENTION

This invention is in the field of rotary engine devices having axially slidable vanes in a fixed chamber extending oblique to the axis of rotation.

Engine devices of the above type are known, as exemplified by the patent to Waldie U.S. Pat. No. 2,380,886. However, in all such devices known to this applicant, the side walls and outer periphery of the chamber are stationary and the vanes must slide along all those surfaces as they rotate, thus inducing excessive wear and presenting sealing problems. Furthermore, in such prior art devices constructed as internal combustion engines it was necessary to accomplish a complete cycle of intake, ignition, power stroke and exhaust for each expansible chamber once during each revolution of the rotor. Other prior art devices propose motors of this type wherein the sides of the chamber are not oblique to the axis but undulate in an axial direction and wherein the casing and rotor rotate in opposite directions, seeking to provide four-stroke-cycle operation. Such devices, however, are complicated and difficult to construct.

SUMMARY OF THE INVENTION

It is a principal object of this invention to provide a rotary engine of the axially slidable vane type in which friction between the vanes and chamber walls is reduced to a minimum.

Another object of the invention is to provide such an engine wherein the outer portion of the engine chamber rotates with the rotor.

A further object of the present invention is to provide such a rotary device as an internal combustion engine, of simplified construction, employing a four-stroke-cycle of operation.

An additional object of the invention is to achieve the previous object in such an engine having a control cam fixed to the rotor.

A still further object is to achieve the foregoing objectives in an engine wherein the chamber is provided with planar side walls.

BRIEF DESCRIPTION OF THE DRAWINGS

FIG. 1 is a side elevational view of an engine embodying the present invention;

FIG. 2 is a sectional view taken along the angled line 2—2 of FIG. 1;

FIG. 3 is a sectional view taken along the line 3—3 of FIG. 2, with portions of the rotor broken away;

FIGS. 4, 5, 6 and 7 are schematic sectional views through portions of the engine; and FIG. 8 is a developed view of a control cam constituting a part of the present invention.

DESCRIPTION OF A PREFERRED EMBODIMENT

Referring first to FIG. 2, the engine comprises an outer housing made up of housing halves 2 and 4 held together by bolts or the like 6 extending through peripheral flanges 8. The housing thus defines a hollow generally cylindrical interior in opposite axial ends of which are positioned circular wedge shaped members 10, each having a flat surface abutting an inner end wall 12 of the housing and an obliquely extending planar surface 14. The surfaces 14 are parallel and planar, each extending oblique to the engine axis defined by shaft 16, as will be further described. The members 10 are provided with central bosses 18 defining trunnions or bearing members on which a rotor hub 20 is journalled. The rotor hub 20 is of spherical shape, about a center 22 midway between surfaces 14, and recesses 24 in the hub constitute journalling surfaces to rotatably support the hub about the bosses 18 while relieving shaft 12 of radial pressure. The shaft 16 extends axially through the engine with the hub 20 keyed thereon, the shaft being rotatable in the bosses 18, members 10 and end walls 12.

The rotor hub 20 has formed thereon a circumferential web 26 extending radially therefrom in a central plane perpendicular to the shaft 16 but the sides of the web are conical surfaces converging outwardly at the same angle as the angle of inclination of the oblique surfaces 14. Thus, in one circumferential position, a side of the web 26 is in close proximity to a surface 14 whereas at a diametrically opposite position it is at a maximum spacing from that surface.

The web 26 is provided with a plurality, in this case, seven, of axially extending radial slots 28 (see FIG. 3). In each of the slots an axially extending vane 30 is positioned for axial sliding movement in its respective slot. The sides of the vanes 30 are straight and parallel and slidably engage the respective surfaces 14. The inner edge of each vane 30 is spherically curved, as at 32, complementary to and in axially slidable engagement with the outer spherical surfaces of hub 20. The outer edges 34 of the vanes 30 are also configured to generally spherical shape concentric to the spherical hub 20.

A pair of ring members 36 are secured to the outer periphery of the web 26 by means not shown, but are rigidly fixed thereon and define an inner spherical surface 38 against which the outer edges of the vanes 30 abut and slide. Thus, the rotor comprising shaft 16, hub 20, web 26 and rings 36 rotate as a unit within the housing previously described. Clearance between the ring members 36 and the housing and, if necessary, between the spherical inner surfaces of the rings 36 and the outer spherical surfaces of members 10 is provided so that the rotor may rotate freely within the housing. As will be obvious, rotation of the rotor will enforce rotation of the vanes 30 within the chamber defined between members 10 and cause those vanes to oscillate axially through the slots 28. It is to be noted that the vanes 30 thus rotate about the axis of shaft 16 in an oblique plane but each vane travels in a true circular orbit without changing its radial distance from the center 22. It is to be noted that as the vanes are forced to slide axially through the slots 28, their outer edges slide along the spherical surface 38 of the ring members 36 but there is no relative sliding movement therebetween in a circumferential direction, both the vanes 30 and the rings 36 rotate about the engine axis at the same speed. This eliminates circumferential friction between the vanes 30 and an outer housing wall.

Engines of this general type have been known but in all such cases the vanes rotate within a chamber having a stationary outer wall. Centrifugal force on the vanes cause them to exert great pressure against the outer wall of such engine and since they slide on those outer walls in both an axial and circumferential direction, excessive wear is produced and difficulty has been experienced in providing proper seals. In the present arrangement, the vanes slide only axially relative to the rings 36 and thus a great deal of sliding friction is eliminated, making proper sealing relatively easy.

As is apparent, the space between successive vanes 30 constitutes variable volume compartments that vary from a minimum volume in one circumferential position of the rotor to a maximum volume at a diametrically opposite position and those variable volume compartments reach their maximum and minimum volumes at diametrically opposite positions on opposite sides of the web 26. Thus, the two sides of the web define two separate sets of variable volume compartments that vary in volume 180° out of phase with each other.

A drum cam 40 is keyed to the shaft 16 outwardly of each end wall 12 of the engine housing for rotation with the shaft 16 and engine rotor. A suitable cover plate 43 may be provided. Since each axial end of the engine, on opposite sides of the web 26 is identical to the other, only one will be described herein, it being understood that the same structure and operation is repeated on the other side but is 180° out of phase therewith.

The drum cam 40 is provided with a peripheral cam groove 42, to be described in greater detail, which actuates valves, fuel injection means and ignition means in proper timed relation to the rotation of the engine rotor, as will be more fully described hereafter.

Referring now to FIG. 3, the end members 10 are provided with a plurality of ports and other means, comprising an exhaust port 44, an inlet port 46, a fuel injection orifice means 48, an inlet 50 to a pressure passage 52, a compartment cleaning valve port 54, and an ignition means such as spark plug 56. Each of the elements listed above is under the control of the drum cam 40. Referring now to FIG. 8, which is a developed view of the periphery of the cam 40, there is shown a single cam groove 42 of sinuous shape and which cam groove extends twice around the periphery of the drum cam and the crests 58 and 60 are equal in number to the vanes and, therefore, the variable volume compartments between the vanes. The sinuous cam track is arranged so that the crests of one turn are between crests of the other turn with the groove crossing itself at cross over points 62. Thus, a cam follower sliding in the cam groove along the path indicated by the arrows of FIG. 8 will first follow one turn of the groove and at the end of one turn it will be transferred to the other turn of the groove so that it reciprocates axially in the manner indicated. It is to be noted that the path defined by the arrows of FIG. 8 terminate at the right hand side of the figure in a portion of the cam groove near the top of the figure which is the beginning of the other turn as indicated by the broken line at the top of FIG. 8 showing that that follower will then follow a path along the other turn of the groove and will reciprocate to its upper and lower axial positions in regions intermediate those axial positions it reached on the previous turn of the cam. Thus, any cam follower in the groove 42 arranged to actuate an engine element will actuate that element only on alternative passages of any given compartment past the position of that element. Thus, referring to FIG. 3, the compartment between the vanes A and B will pass the inlet port 46, for example, once each revolution of the rotor but a valve controlling that port will be opened to the compartment between vanes A and B only on alternate rotations of the rotor.

The letters X and Y in FIG. 3 denote those peripheral regions of the engine wherein the compartments between vanes and below the web 26 as viewed on FIG. 2 reach their maximum and minimum volumes. At X the compartments are of maximum volume and at Y they are of minimum volume as previously described.

As shown in FIG. 2, the inlet port 46, for example, extends axially through the member 10 and communicates with a passageway 64 communicating with a source (not shown) of fresh air. An inlet valve 66 is axially slidable in the port 46 and is provided with a stem 68 on which a cam follower 70 is carried and which slides in the cam groove 42 of drum cam 40. The cam follower 70 for each of the devices to be described is preferably of the shape shown best in FIGS. 5–7 whereby it may follow the curves of the sinuous cam groove and move across the crossover points 62 without impediment. While not shown herein a similar valve is provided for the outlet port 44, it being noted that the inner surfaces 72 of the valves for both the outlet port 44 and inlet port 46 are planar surfaces and when the valve is in its closed position that surface is coextensive with the flat surface 14 of member 10. Thus, a passage of a vane over the port when the valve is closed will maintain a proper seal between the adjacent compartments. A passageway corresponding to the fresh air inlet 64 is provided for the outlet port 44 but communicates with ambient atmosphere as an exhaust.

FIG. 4 shows a fuel injection means at the position 48 of FIG. 3. The pressure port 50, previously referred to, and pressure passage 52 are as shown in FIG. 4 wherein the inlet 50 opens into the engine chamber to communicate with a compartment closely adjacent the minimum volume position thereof and the passageway 52 leads to a piston chamber 74 in which a piston 76 is slidable. The piston 76 is provided with a cam groove follower 70 and, therefore, reciprocates as the cam 40 rotates. In its upper position, the piston 76 blocks the pressure passage 52 but that passage is open to the chamber 74 when the piston is in its lower position. The lower end of the piston 76 constitutes a pump adapted to draw fuel from a supply thereof indicated at 78 through a check valve 80 into the lower part of the chamber 74. As the piston 76 moves downwardly, it pumps that fuel past check valve 82 into an atomizing nozzle 84 having its nozzle tip in a further chamber 86 communicating with the port identified by numeral 48 previously referred to. A passageway 88 provides communication between the upper part of chamber 74 and the chamber 86 through a suitable screen or filter 90. As shown, an accelerator or throttle control linkage 92 may be provided to actuate a control valve 94 for determining the quantity of fuel drawn into the chamber 74 at each reciprocation of pump cylinder 76.

The compartment cleaning valve at 54 in FIG. 3 is shown in greater detail in FIG. 5. The passageway 100 opens through surface 14 of member 10, at port 54, into the engine chamber at a region close to position Y and that passageway extends across a guide opening 102 in which an exhaust valve 104 is axially slidable. The exhaust valve 104 is provided with a cam follower 70 in groove 42 of drum cam 40. The valve member 104 is provided with a transverse opening 106 which is aligned with the passage leading to port 100 in the lower position of the valve but which is out of alignment therewith when the valve is in its upper position and thus communication with the engine chamber is blocked. The passage leading from port 100 exhausts to atmosphere at the exterior of the engine housing wall 12.

Ignition device 56 is shown in greater detail in FIGS. 6 and 7 and may comprise the spark plug 106 illustrated. The spark plug is provided with a conductor 108 connected to a fixed terminal 110 extending to the inner surface of a guide member 112 of insulating material and in which a non-conductive rod 114 is slidably mounted. The rod 114 is provided with a cam follower 70 slidable in the cam groove 42 of cam 40. A second fixed terminal 116 at the end of a conductor 118 is positioned to extend into the guide member 112 opposite the fixed terminal 110 and the non-conductive rod 114 is provided with a conductive band or portion 120. When the slide rod 114 is in the lower position shown in FIG. 6, the circuit from conductor 118 to conductor 108 is broken whereas when the rod 114 is in its upper position, as shown in FIG. 7, the conductive band 120 completes a circuit between conductors 118 and 108 and high voltage energy is conducted to the spark plug 106 to cause the same to fire.

Referring now to FIG. 3 wherein the arrows C indicate the direction of rotation of the engine rotor, those compartments at the left of the figure are near maximum volume whereas that at the right side of the figure is of minimum volume, the compartments expanding in volume as they travel from Y to X and contracting in volume as they travel from X to Y. Let it be assumed that at the instant shown in FIG. 3, the inlet valve 46 is open, as illustrated in FIG. 2. As will be described later, the compartment between vanes A and B which will be referred to hereafter as compartment D, is under subatmospheric pressure (as will be described) until the vane B moves over inlet port 46 at which time (the valve 66 being open) fresh air rushes into the compartment and the vane A approaches the fuel injector port 48, the compartment D starts to reduce in volume thus starting compression of the air therein. At about that time the fuel injector piston 76 is in its upper position having drawn a charge of fuel into chamber 74 and starts downward to pump that fuel through the atomizer nozzle 84 and into chamber 86 and through port 48. It is to be seen from FIG. 3 that the port 50 and passage 52 communicate with the second fuel compartment ahead of compartment D, in which the air and fuel has been compressed to a relatively high pressure, thus high pressure exists in the passageway 52. As the piston 76 moves downward, it not only atomizes fuel in chamber 86 but opens passage 52 to chamber 74 and hot compressed gas enters that chamber, moves through passageway 88 into chamber 86 and not only heats the atomized fuel but forces the same into compartment D in which a charge of fresh air has just been induced. Those conditions exist until the trailing vane of that leading compartment passes over port 50 and continued rotation of the rotor compresses the fuel and air mixture until the vane B approaches close to position Y. At that time compartment D is of minimum volume with its air fuel mixture fully compressed and as vane B moves closer to position Y that portion of the compartment D rearwardly of vane B begins to expand slightly while the portion between Y and vane A continues to reduce in volume at the same rate. As stated previously, the side of the web 26 approach quite close to the surface 14 at this point but does not come into actual contact therewith. The space therebetween defines a narrow slit through which following vane A forces the air and fuel mixture to further ensure proper mixing and turbulence therein. After the leading vane A of compartment D passes the spark plug 56, the rod 114 reaches the upper position shown in FIG. 7 to cause the spark plug to fire and ignite the fuel and air mixture in compartment D. It is to be noted that, due to the shape of the cam groove 42, the rod 114 is in its upper position for a substantial period of time. Actually, it is contemplated that the spark be continuous during substantially the entire period when the spark plug is exposed to compartment D, thus ensuring complete and thorough ignition and combustion of the fuel in that chamber.

As compartment D then moves from Y toward X, the pressure produced by the burning and burned fuel therein exerts its power stroke providing a pulse of power to engine rotor until compartment D reaches a position where it is exposed to outlet port 44. At that time outlet port 44 is open to permit the pressurized gases in compartment D to flow out to exhaust. Obviously, however, all of those gases do not exhaust at this time, only enough gas leaves the chamber to reduce the pressure therein to substantially atmospheric. The previous passage of compartment D over the inlet port 46 found that port open so that fresh air could be induced. However, at this passage of compartment D over port 46, the valve 66 is closed and the remaining spent gases are trapped in that compartment. The gases are thus compressed as the compartment D moves from X toward Y and when that compartment is exposed to the exhaust port 54, the valve rod 104 is in its lower position, as shown in FIG. 5, and those compressed spent gases are caused to exhaust to atmosphere, leaving only a very minimum amount of spent gas in compartment D. As compartment D passes the spark plug 106 on this revolution, the circuit to the spark plug is open and no spark is produced. As the compartment D then moves from Y toward X, it expands in volume and a partial vacuum is produced therein. Thus, this time the evacuated compartment D will pass over port 44 at a time when its valve is closed and until the compartment reaches exposure to inlet port 46, which is at that time opened by the drum cam 40 and fresh air rushes into the compartment, it being remembered that a substantial vacuum has been drawn in the compartment during its passage from Y to X. Thus, the cycle already described is repeated and this complete cycle is repeated for each compartment of the engine although only alternate compartments are charged and fired at each revolution of the rotor. Also, the group of compartments on the opposite side of the web 26 go through the same cycles of operation at positions 180° out of phase with those heretofore described and, in the example shown, seven power impulses are imparted to the rotor at each revolution thereof.

While reference herein has been made to the various edges of the vanes 30 as being complementary in shape to the surfaces they engage, it would be more practical to provide clearances and effect sealing at the edges of the vanes by such means as the sealing bars shown at 121 in FIG. 4.

The engine described thus operates on a "four-stroke-cycle" type of operation, that is, each compartment goes through four changes of volume for each power impulse it delivers.

As will be obvious to those skilled in the art, the device shown may be modified to function as a pump while retaining many of the advantageous features described.

While a single specific embodiment of the invention has been shown and described herein, the same is merely illustrative of the principles involved and other forms may be resorted to within the scope of the appended claims.

I claim:

1. A rotary engine device comprising:
    a housing having means defining an axis and means defining side walls of a chamber, said side walls being opposed, axially spaced parallel walls extending oblique to and around said axis;
    a rotor journalled in said housing for rotation about said axis, said rotor having a spherical portion spanning the space between said side walls and defining the radially inner surface of said chamber;
    a circumferential web fixed to said spherical portion and extending radially of said axis between said side walls;
    a ring fixedly mounted on the outer edge of said web to rotate therewith and having a spherical inner surface, concentric to said spherical portion, and completely spanning the space between said side walls, throughout the periphery thereof, to define the radially outer surface of said chamber;
    a plurality of radial slots extending axially through said web;
    a vane axially slidable in each of said slots and having edges complementary to and slidably engaging said side walls and said radially inner and outer surfaces of said chamber to divide said chamber, on each side of said web, into variable volume compartments; and
    fluid inlet and outlet ports in said housing arranged to successively communicate with each of said compartments as said rotor and vanes rotate in said housing.

2. A rotary engine device as defined in claim 1 wherein said side walls have outer edges complementary in shape to said spherical inner surface and wherein said spherical inner surface extends over said outer edges.

3. A rotary engine device as defined in claim 1 wherein the sides of said web converge outwardly at an angle substantially equal to the angle of obliquity of said side walls and being so dimensioned that said sides are in close proximity, throughout their radial extent, to said respective side walls at their regions of nearest approach.

4. A rotary engine device as defined in claim 1 including a drum cam device fixed to said rotor outwardly of axially opposite sides of said housing and having a peripheral cam groove therein, axially movable valve members on said housing for opening and closing said inlet and outlet ports, and cam follower means on said valve members slidably engaging said cam groove.

5. A rotary engine device as defined in claim 4 wherein said device is an internal combustion engine having fuel injection means between said inlet ports and said regions of nearest approach and ignition means adjacent said regions of nearest approach, said ignition means including at least one electrical conductor having a gap therein, a non-conductive member axially slidable on said housing, through said gap, cam follower means on said non-conductive member slidably engaging said cam groove, said non-conductive member having a conductive portion thereon whereby, in one axial position of said member, said conductive portion spans said gap to complete an electrical circuit through said ignition means.

6. A rotary engine device as defined in claim 4 wherein said device is an internal combustion engine having fuel injection means between said inlet ports and said regions of nearest approach, said fuel injection means including a fuel inlet passage communicating with said chamber adjacent said inlet port and a further passageway communicating with said chamber adjacent said region of nearest approach to conduct fluid pressure therefrom to said fuel injection means, and means for applying said conducted fluid pressure to fuel in said fuel inlet passage.

7. A rotary engine device as defined in claim 6 wherein said last-named means includes a metering device, axially slidable on said housing and having a cam follower slidably engaging said cam groove, said metering device being arranged whereby in one axial position thereof a metered charge of fuel is directed to said fuel inlet passage and said further passageway is blocked and in another axial position thereof said further passageway communicates with said fuel inlet passage.

8. A rotary engine device as defined in claim 1 including a drum cam device fixed to said rotor outwardly of at least one axial end of said housing and having a cam track comprising a single continuous and sinuous cam groove extending twice therearound, in two turns, with the groove of one turn crossing the groove of the other turn twice between crests thereof whereby said groove defines successive crests extending in each axial direction with only alternate crests being defined by each turn of said groove, the number of said crests being equal to the number of said vanes; axially movable valve members on said housing for opening and closing said inlet and outlet ports, and cam follower means on said valve members slidably engaging said cam groove.

9. A rotary engine device as defined in claim 8 wherein said device is an internal combustion engine having fuel injection means and ignition means, said fuel injection means and said ignition means each having an actuating member axially slidable on said housing and each having cam follower means slidably engaging said cam groove whereby each of said valve members, fuel injection means and ignition means is actuated only on alternate passages of each of said compartments thereby.

10. In a rotary internal combustion engine having a housing defining a chamber and a rotor having means in said chamber dividing the same into a plurality of variable volume compartments each of which is caused to go through one complete cycle of expansion and contraction at each revolution of said rotor and inlet and outlet ports communicating with said chamber, the improvement comprising:
    a drum cam device fixed to said rotor outwardly of at least one axial end of said housing and having a cam track comprising a single continuous and sinuous cam groove extending twice therearound, in two turns, with the groove of one turn crossing the groove of the other turn twice between crests thereof whereby said groove defines successive crests extending in each axial direction with only alternate crests being defined by each turn of said groove, the number of said crests being equal to the number of said compartments; movable valve members on said housing for opening and closing said inlet and outlet ports, and cam follower means on said valve members slidably engaging said cam groove.

11. A rotary engine device as defined in claim 10 wherein said engine is provided with fuel injection means and ignition means, said fuel injection means and said ignition means each having an actuating member movable on said housing and each having cam follower means slidably engaging said cam groove whereby each of said valve members, fuel injection means and ignition means is actuated only on alternate passages of each of said compartments thereby.

* * * * *